No. 730,430. Patented June 9, 1903.

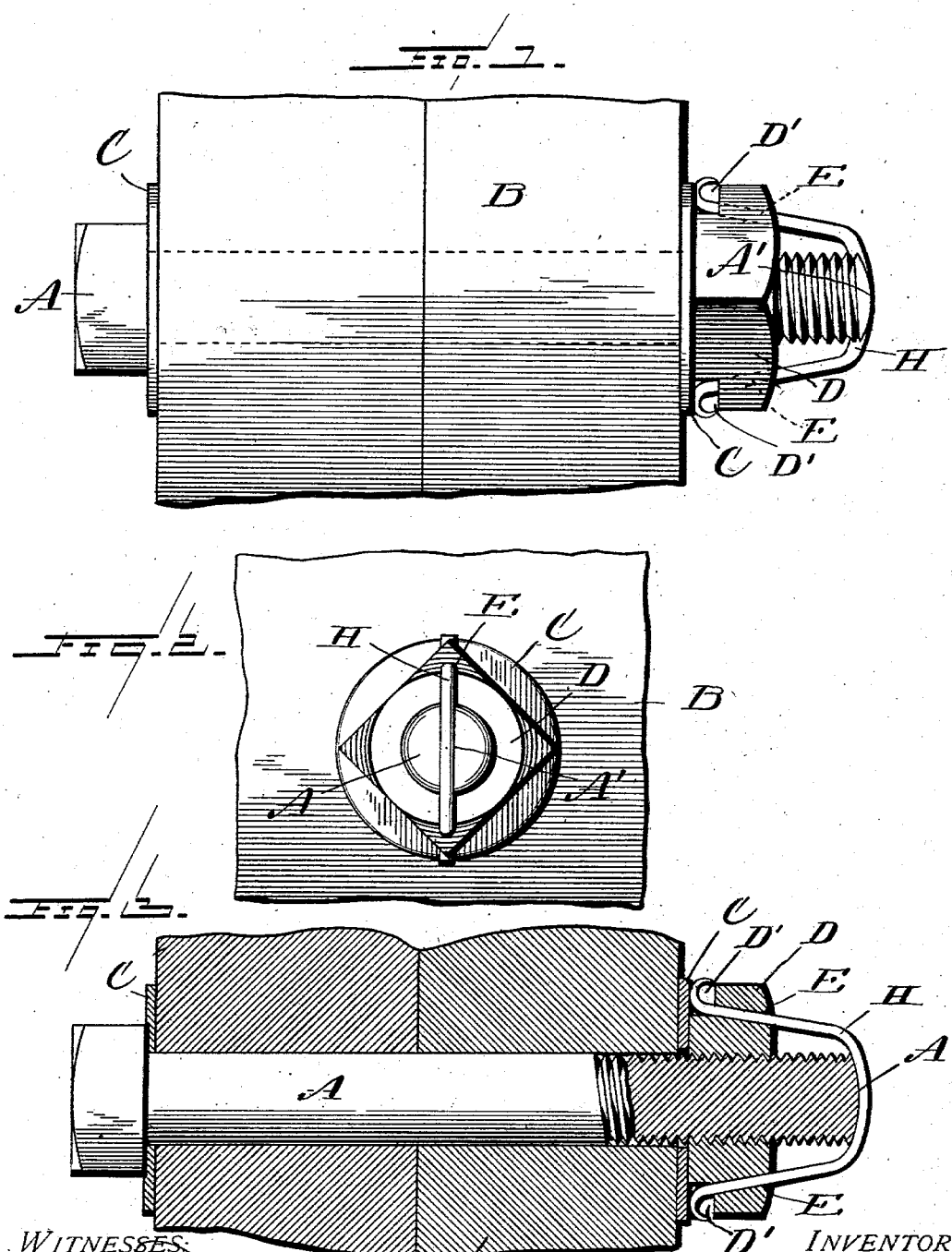

UNITED STATES PATENT OFFICE.

LEMUEL D. WOODS, OF CANDIA, NEW HAMPSHIRE.

NUT-LOCK.

SPECIFICATION forming part of Letters Patent No. 730,430, dated June 9, 1903.

Application filed March 26, 1903. Serial No. 149,748. (No model.)

*To all whom it may concern:*

Be it known that I, LEMUEL D. WOODS, a citizen of the United States, residing at Candia, in the county of Rockingham and State of New Hampshire, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks, and particularly in the provision of a locking-key which is held in a slot in the end of the bolt and having ends which are passed through diagonally opposite corners of the nut and engage shoulders formed on the corners of the nut, thereby preventing the nut from turning independent of the bolt.

The invention consists, further, in various details of construction of the device and arrangements of parts, which will be hereinafter fully described and then specifically defined in the appended claim.

My invention is illustrated in the accompanying drawings, which, with the letters of reference marked thereon, form a part of this application, and in which drawings—

Figure 1 is a side elevation of my improved nut-lock. Fig. 2 is a top plan view, and Fig. 3 is a sectional view longitudinally through the key of the lock.

Reference now being had to the details of the drawings by letter, A designates a bolt passing through the plates B, and C is a washer placed over the bolt after being inserted through said plates. The nut D has two recessed portions D', formed upon diagonally opposite corners of the nut and cut in from the inner face of the nut. The bolt is of the usual construction, excepting that it has a slot A' in one end, and the interior threaded circumference of the nut is adapted to turn upon said bolt. Holes E are formed through two of the corners of the nut diagonally opposite, opening from the outer face of the nut through into the shouldered portion, as shown, and in applying the lock the nut is screwed against the washer, and the wire H is inserted in said slot in the end of the bolt, and the ends of the wire are inserted in the holes formed in the corners of the nut, and by forcing the ends of the wire down through the holes and against the washer B the ends of the wire are turned or clenched in the manner illustrated in the drawings, thereby securely holding the nut from turning upon the bolt.

By the provision of a nut-lock embodying the features of my invention it will be readily seen that the nut will be positively held from turning independent of the bolt, and when it is desired for any purpose to remove the nut an instrument may be inserted between the nut and the wire and the wire pried out of the hole in the corner of the nut, after which the nut may be easily removed.

While I have shown a particular construction of nut-lock embodying the features of the device, it will be understood that I may make alterations in the device as to the locking-key, &c., without departing from the spirit of the invention.

Having thus fully described my invention, what I claim as new, and desire to secure by Letters Patent, is—

A nut-lock comprising, in combination with a bolt with slotted end, a washer, a nut threaded upon the bolt, two of the diagonally opposite corners being cut away forming shoulders, said corners having apertures opening through said shoulders, and a key resting in said slot and having its ends inserted through said apertures and adapted to be clenched about the shoulders by being forced against the washer, as set forth.

In testimony whereof I hereunto affix my signature in presence of two witnesses.

LEMUEL D. WOODS.

Witnesses:
GEO. W. PRESCOTT,
FRANK MCCUESTON.